US008108166B2

(12) United States Patent
Arnold et al.

(10) Patent No.: US 8,108,166 B2
(45) Date of Patent: Jan. 31, 2012

(54) ANALYSIS OF CHIRP FREQUENCY RESPONSE USING ARBITRARY RESAMPLING FILTERS

(75) Inventors: Jack Harris Arnold, Cedar Park, TX (US); Douglas Scott Bendele, Austin, TX (US); Xianglin Mo, Shanghai (CN); Chen Zhang, Shanghai (CN)

(73) Assignee: National Instruments Corporation, Austin, TX (US)

( * ) Notice: Subject to any disclaimer, the term of this patent is extended or adjusted under 35 U.S.C. 154(b) by 455 days.

(21) Appl. No.: 12/352,642

(22) Filed: Jan. 13, 2009

(65) Prior Publication Data
US 2010/0070226 A1 Mar. 18, 2010

Related U.S. Application Data

(60) Provisional application No. 61/096,473, filed on Sep. 12, 2008.

(51) Int. Cl.
*G06F 19/00* (2011.01)
(52) U.S. Cl. .......................................................... 702/76
(58) Field of Classification Search .................... 702/76, 702/66; 381/98; 367/134
See application file for complete search history.

(56) References Cited

U.S. PATENT DOCUMENTS

| 4,912,661 | A | 3/1990 | Potter |
|---|---|---|---|
| 4,914,568 | A | 4/1990 | Kodosky et al. |
| 5,473,555 | A | 12/1995 | Potter |
| 5,885,225 | A | 3/1999 | Keefe et al. |
| 6,332,116 | B1 | 12/2001 | Qian et al. |
| 6,366,862 | B1 | 4/2002 | Qian et al. |
| 6,477,472 | B2 | 11/2002 | Qian et al. |
| 6,810,341 | B2 | 10/2004 | Qian et al. |
| 7,720,237 | B2 | 5/2010 | Bharitkar et al. |
| 7,787,640 | B2 | 8/2010 | Turicchia et al. |
| 7,826,626 | B2 | 11/2010 | Bharitkar et al. |
| 2004/0186680 | A1* | 9/2004 | Jin et al. ......................... 702/147 |
| 2004/0199348 | A1* | 10/2004 | Hitchcock et al. .............. 702/92 |
| 2008/0086668 | A1* | 4/2008 | Jefferson et al. .............. 714/741 |

OTHER PUBLICATIONS

Angelo Farina; "Simultaneous Measurement of Impulse Response and Distortion with a Swept-Sine Technique"; Presented at the Audio Engineering Society 108th Convention Feb. 19-22, 2000; Paris, France; 24 pages.

* cited by examiner

*Primary Examiner* — Bryan Bui
(74) *Attorney, Agent, or Firm* — Meyertons Hood Kivlin Kowert & Goetzel, P.C.; Jeffrey C. Hood; Joel L. Stevens

(57) ABSTRACT

Log chirp testing where a log chirp may be provided to a device under test and a first time domain response from the device under test may be received. The first time domain response may be in the time domain. The first time domain response may be converted to the angular domain to create an angular domain response. Converting to the angular domain response may include resampling the time domain response from the time domain to the angular domain. The angular domain response may be filtered and/or analyzed. The angular domain response may be converted to a second time domain response. Similar to above, the conversion may include resampling the angular domain response from the angular domain to the time domain. The first time domain response and the second time domain response may be analyzed. Testing results of the device under test may be generated and stored based on said analyzing.

20 Claims, 5 Drawing Sheets

US 8,108,166 B2

ANALYSIS OF CHIRP FREQUENCY RESPONSE USING ARBITRARY RESAMPLING FILTERS

PRIORITY CLAIM

This application claims benefit of priority of U.S. provisional patent application Ser. No. 61/096,473 titled "Analysis of Log Chirp Frequency Response Using Arbitrary Resampling Filters", filed on Sep. 12, 2008, whose inventors were Jack Harris Arnold, Douglas Scott Bendele, Xianglin Mo, and Chen Zhang, and which is hereby incorporated by reference in its entirety as though fully and completely set forth herein.

FIELD OF THE INVENTION

The present invention relates to the field of testing, and more particularly to a system and method for testing frequency response of chirps using filters.

DESCRIPTION OF THE RELATED ART

As the popularity of various devices and components, e.g., audio device and components, have increased, testing of these components has become increasingly important. Manufacturers want to ensure that their customers receive products that are fully operational and do not include any defects that would result in a return of the product.

However, testing also takes a specific amount of time for every manufactured product. Thus, decreases in testing time, even very small ones, can result in much higher production rates. Thus, more efficient testing of devices and components is desirable.

SUMMARY OF THE INVENTION

Various embodiments are presented of a system and method for analyzing frequency response of stimulus signal testing.

A stimulus signal (e.g., a log chirp) may be provided to a device under test. A first time domain response from the device under test may be received. The first time domain response may be in a time domain. The first time domain response may be converted to an angular domain to create an angular domain response. Converting to the angular domain response may include resampling the time domain response from the time domain to the angular domain.

The angular domain response may be filtered and/or analyzed. For example, the fundamental tones may be filtered from the harmonic tones in the angular domain response. Additionally, or alternatively, filtering the angular domain response may include performing order tracking analysis, e.g., to obtain a frequency response. In one embodiment, filtering the angular domain response may include performing order power spectrum analysis and/or residual analysis.

The angular domain response may be converted to a second time domain response. Similar to above, the conversion may include resampling the angular domain response from the angular domain to the time domain.

The first time domain response and the second time domain response may be analyzed. For example, the first time domain response may be subtracted from the second time domain response, and the resulting time domain response may be analyzed.

Testing results of the device under test may be generated and stored based on said analyzing.

BRIEF DESCRIPTION OF THE DRAWINGS

A better understanding of the present invention can be obtained when the following detailed description of the preferred embodiment is considered in conjunction with the following drawings, in which.

Figure 1A:
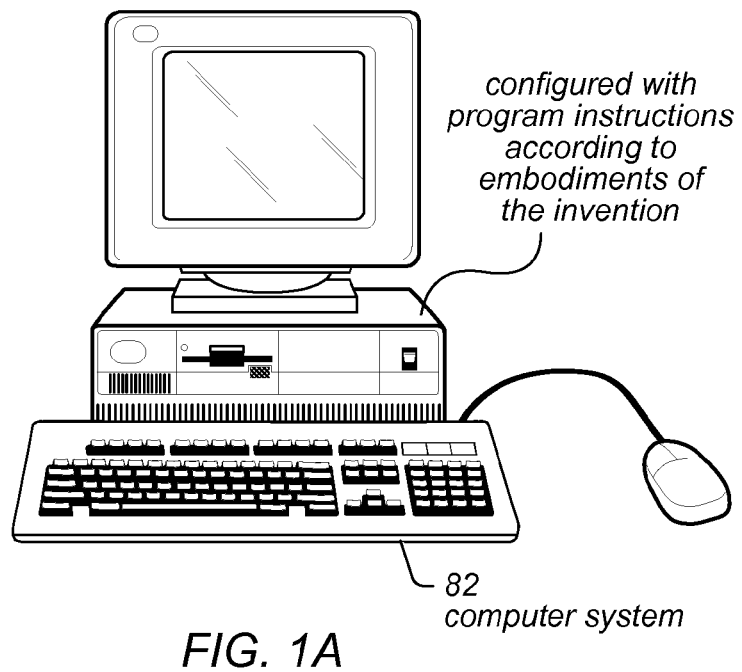
FIG. 1A illustrates a computer system operable to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Pat. No. 4,914,568, titled "Graphical System for Modeling a Process and Associated Method," issued on Apr. 3, 1990.

U.S. Pat. No. 4,912,661, titled "Tracking and resampling method and apparatus for monitoring the performance of rotating machines", issued on Mar. 27, 1990.

U.S. Pat. No. 5,473,555, titled "Method and apparatus for enhancing frequency domain analysis", issued on Dec. 5, 1995.

U.S. Pat. No. 6,366,862, titled "System and method for analyzing signals generated by rotating machines", issued on Apr. 2, 2002.

U.S. Pat. No. 6,332,116, titled "System and method for analyzing signals of rotating machines", issued on Dec. 18, 2002.

U.S. Pat. No. 6,477,472, titled "Analyzing signals generated by rotating machines using an order mask to select desired order components of the signals", issued on Nov. 5, 2002.

U.S. Pat. No. 6,810,341, titled "Time varying harmonic analysis including determination of order components", issued on Oct. 26, 2004.

"Simultaneous measurement of impulse response and distortion with a swept-sine technique" presented at the 108th AES Convention (Feb. 19-22, 2000), Angelo Farina.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

FIG. 1A—Computer System

FIG. 1A illustrates a computer system 82 operable to perform stimulus signal testing of a device under test.

As shown in FIG. 1A, the computer system 82 may include a display device operable to display a testing program, e.g., while performing stimulus signal testing of a device under test coupled to the computer system 82. In some embodiments, the testing program may be a graphical program. The display device may also be operable to display a graphical user interface or front panel of the testing program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more testing programs, e.g., testing graphical programs, which are executable to perform the methods described herein. Additionally, the memory medium may store a programming development environment application (e.g., a graphical programming development environment) used to create and/or execute such testing programs. The memory medium may also store operating system software, as well as other software for operation of the computer system. Various embodiments further include receiving or storing instructions and/or data implemented in accordance with the foregoing description upon a carrier medium.

Figure 1B:
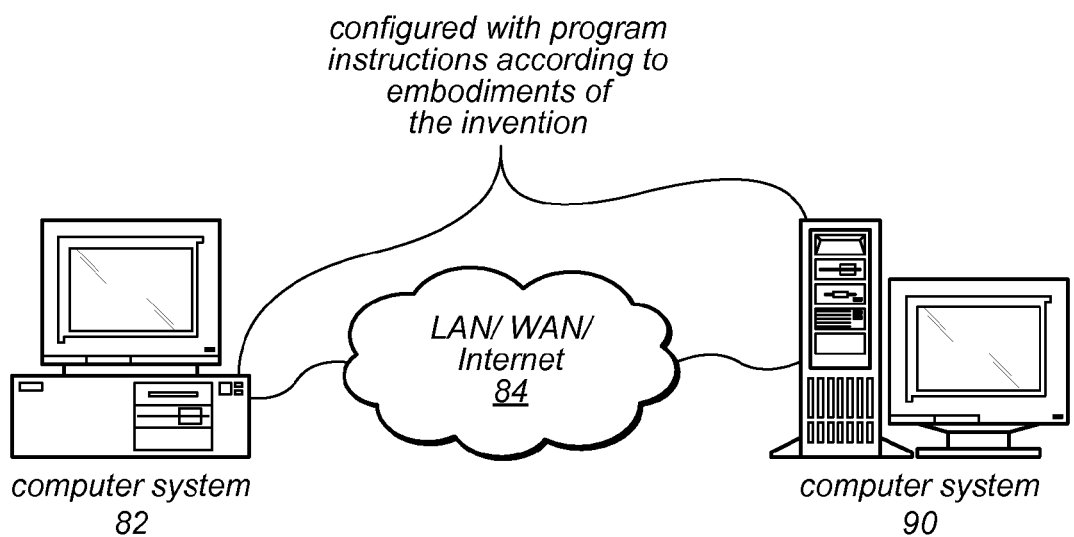
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a testing program in a distributed fashion and/or may perform testing of the device under test in a distributed fashion. For example, computer 82 may execute a testing program for a device under test coupled to the computer system 90.

FIG. 2

Figure 2:
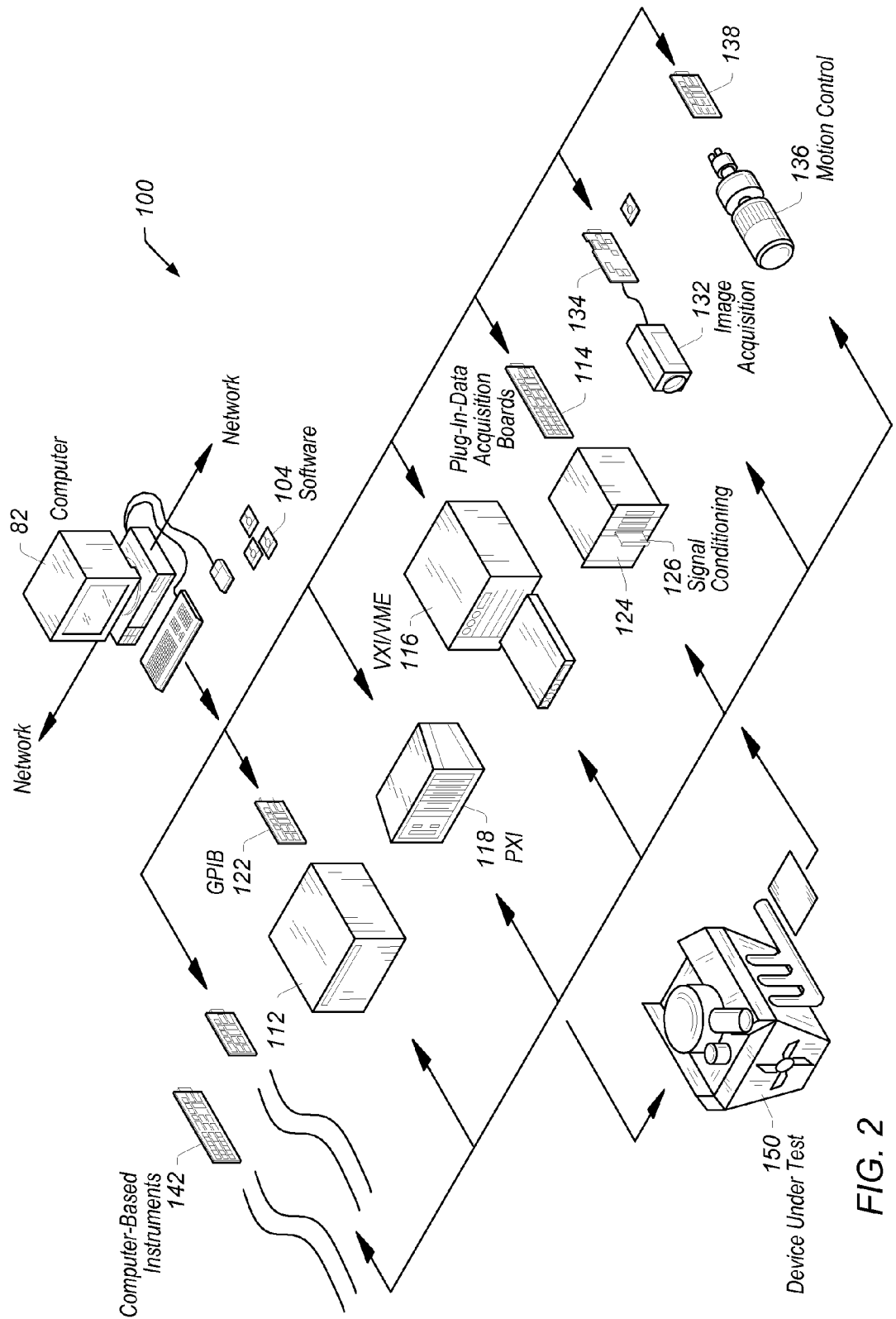
FIG. 2 illustrates an exemplary system according to one embodiment of the invention.

FIG. 2 illustrates an exemplary system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure, control, or test a Device under test (DUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (DUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3:
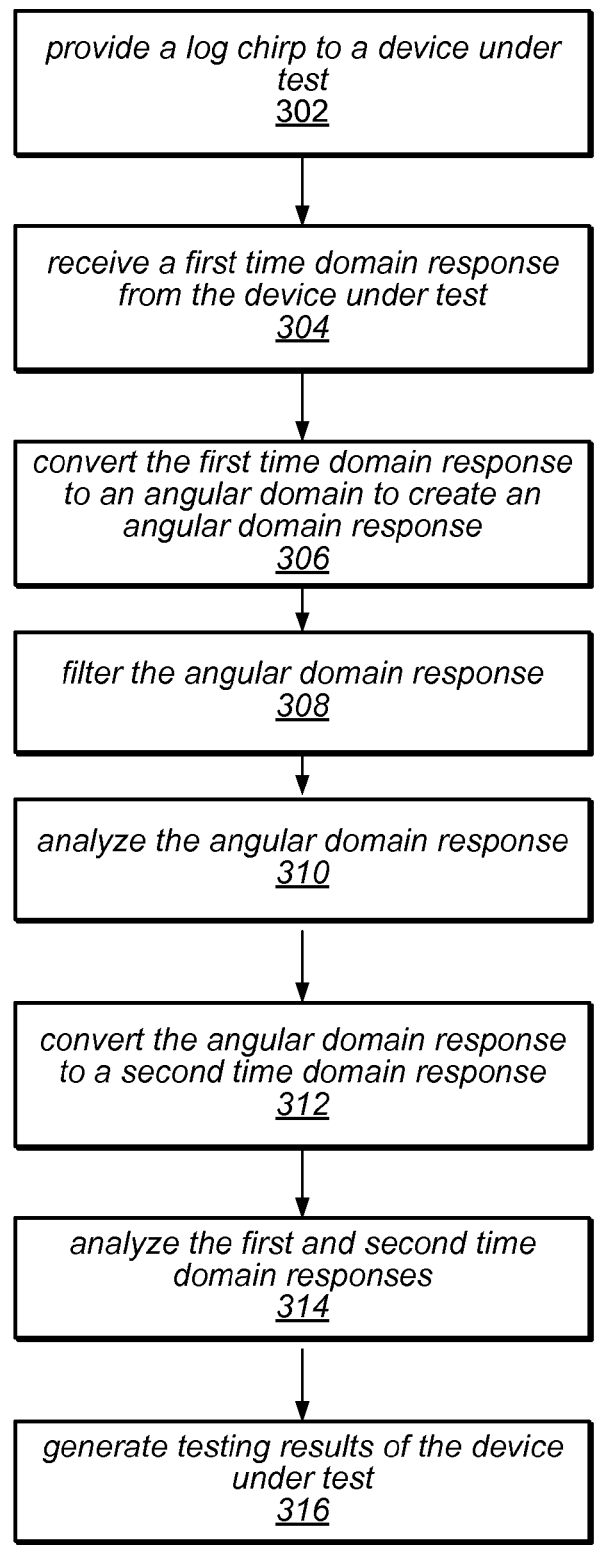
FIGS. 3-5 are flowchart diagrams illustrating some embodiments for testing using stimulus signals.

FIG. 3—Stimulus Signal Testing

FIG. 3 illustrates a method for performing stimulus signal testing on a device under test. The method shown in FIG. 3 may be used in conjunction with any of the computer systems or devices shown in the above Figures, among other devices. Thus, the method in FIG. 3 may be performed by a processor (general purpose CPU or a DSP) executing instructions from a memory medium; a programmable hardware element; a circuit, such as an application specific integrated circuit (ASIC), or any combination thereof.

In various embodiments, some of the method elements shown may be performed concurrently, in a different order than shown, or may be omitted. Additional method elements may also be performed as desired. As shown, this method may operate as follows.

In 302, a known signal may be provided to a device under test. In some embodiments, the known signal may be a chirp signal, e.g., a linear chirp signal, an exponential chirp signal, a log chirp signal, etc. As used herein, a "chirp" signal refers to a signal whose frequency content varies with time. The term "log chirp" is intended to have the full breadth of its ordinary meaning to those skilled in the art, and at least includes a stimulus or signal which may excite a device under test over a broad frequency range in a short duration. For example, a log chirp signal may be a signal whose instantaneous frequency varies logarithmically with time. As one example, the log chirp signal may be a smoothly changing signal. In general the stimulus or known signal may be any type of signal where the frequency and phase relationship of the signal are accurately known.

The device may be related to audio, cell phones, amplifiers, speakers, consumer audio products, and/or any type of device capable of receiving the known signal (e.g., the log chirp) for testing and providing a response for analysis. The signal may be provided to the device via a variety of methods, e.g., locally, over a cable (e.g., a USB cable, Ethernet cable, audio cable, etc.), wirelessly, via a network (e.g., the Internet), etc. This type of testing is especially desirable in systems where a faster test increases production throughput of the device under test. Thus, a signal (e.g., the log chirp) may be more desirable over a plurality of tests for different frequency domains of the device under test.

In 304, a first time domain response from the device under test may be received. For example, the device under test may receive the stimulus signal and respond accordingly. The response may then be received, e.g., using various reception devices, such as microphones, probes, power meters, etc. The response may be received over a network (e.g., from the reception devices), via a cable, etc. via wired or wireless means, as desired.

In 306, the first time domain response may be converted to an angular domain to create an angular domain response. The first time domain response may be converted to the angular domain using a resampling process, which may be achieved more easily since the frequency and phase at each point of the signal is known. Thus, the first time domain response may be converted to the angular domain relative to the signal itself. In converting to the angular domain, the response may be sampled at even angles meaning that each cycle has the same number of samples (compared to the time domain where lower frequencies have more samples per cycle than higher frequencies). The number of samples per cycle may be directly related to the harmonic bandwidth of the angular domain signal. In order to measure up to the $5^{th}$ harmonic, at least 10 samples per cycle may be required. In some embodiments, the harmonic bandwidth (i.e. samples per cycle) may be configurable. In the angular domain, the fundamental and harmonic components of the signal do not vary in "angular frequency", so they are much easier to isolate and analyze via techniques such as order tracking and order power spectrum, described in more detail below.

In one embodiment, the resampling process may involve the use of a tracking filter which is referenced to the frequency of the stimulus signal. However, various other methods for converting from the time domain to the angular domain may be used. For example, many conversion processes between the angular domain and the time domain are described in U.S. Pat. Nos. 4,912,661; 5,473,555; 6,366,862; 6,332,116; 6,477,472; and 6,810,341, and may be used or modified for use in converting the response from the time domain to the angular domain (and/or vice versa in 512 below).

In 308, the angular domain response may be filtered. In some embodiments, the conversion in 306 and the filtering in 308 may be combined into a single filter processes (e.g., by modifying the tracking filter from above). However, in some embodiments, the angular domain response may be filtered afterwards. In one embodiment, the angular domain response may be stored and then filtered separately into a plurality of different filtered angular domain responses, e.g., to allow for specific analysis and testing of those filtered domain responses. It should be noted that the filter process in 308 may be an optional process.

In some embodiments, the filtering process may be typically associated with testing that involves converting the angular domain back to the time domain, e.g., as described in 312 below. For example, the angular domain response may be filtered to exclude the fundamental of the stimulus signal. Other filtering processes are envisioned. Note that the angular domain response may be otherwise modified (e.g., other than just filtering), e.g., for later testing or analyses, as desired.

In 310, the angular domain response may be analyzed. Analysis of the angular domain response may include performing frequency analysis or order tracking. Order tracking provides a frequency response of a particular harmonic. For example, outlying spikes or troughs in the frequency response may be identified, e.g., by comparing portions of the angular domain response with a control response. Thus, it can be determined if specific undesired distortions or non-linear effects are being produced by the device under test by analyzing portions of the frequency. Similarly, power spectrum analysis of the angular domain response may be performed. Order power spectrum analysis may provide insight into the harmonic content of the response, e.g., allowing for analysis of harmonics produced by the device under test. For example, the analysis may indicate whether the second, third, fourth, fifth, etc. harmonic is over or under produced due to defects in the device under test, e.g., via comparison to a control response. Further descriptions of possible analyses are described below, although numerous other tests or analyses are possible.

In 312, the angular domain response may be converted to a second time domain response. Similar to above, the angular domain response may be converted using a resampling process, such as the tracking filter described above, among other methods.

In 314, the first and/or second time domain response may be analyzed. In some embodiments, analysis of the first and/or second time domain response may include comparing the first and second time domain response. For example, in one embodiment, the second time domain response may have been filtered (e.g., in 308 when it was previously the angular domain response). Thus, the first and second time domain responses may now be different due to the filtering above or other applied processes. The first and second time domain responses may be subtracted, e.g., the first time domain response may be subtracted from the second time domain response. For example, as discussed above, the angular domain response may have been filtered to exclude the fundamental. Accordingly, the subtraction of the first time domain response from the second time domain response may result in a time domain response which only includes noise and/or harmonics of the stimulus signal. The subtracted response (or "residual signal" can then be tested, e.g., using time domain tools such as sound quality analysis, compared against a standard, listened to by a human (to hear if there are any nonlinear artifacts or other distortions that should not be there), and/or other methods. Thus, by using filters in the angular domain, any portion of the signal can be isolated.

In 316, testing results of the device under test may be generated and stored. For example, the testing results may include whether or not the device under test passed or failed according to a testing rubric. However, the testing results could include various graphs, charts, output data, etc. This data may be stored and/or provided to another computer (e.g., over a network) or provided on a display to determine if the device under test passes.

In some embodiments, the above described process may be performed in real-time. Additionally, the method may be performed in a pipelined manner. For example, as the stimulus signal is being produced and provided, portions of the response may be received, converted, analyzed, filtered, converted, and/or analyzed again. Thus, as the stimulus signal (e.g., the log chirp) is being produced, the available portions of the response (those being produced by a previous portion of the stimulus signal) may be being processed and analyzed. This may allow the test to be performed in a more efficient manner. However, in some embodiments, testing may be performed offline, and not in a real time manner. Note that the method may be easily used in a multiprocessor or multicore environment due to this pipelined manner. For example, different cores or processors may handle different steps along the process, thus allowing full use of each of the available cores and/or processors.

Additionally, the above-described method may be implemented and/or performed using a graphical program. The graphical program may include a plurality of interconnected nodes which visually indicate functionality of the graphical program, and may be executable to perform the functionality (in this case, the testing functionality described above, although other functionalities are possible). Use of the graphical program (e.g., as provided by National Instruments) may allow for the use of multiple cores and processors in the pipelined fashion above more easily than typical textual programming methods.

Benefits of the Method

The method described above may provide certain benefits over various prior art methods (such as the Farina method which is described in the paper "Simultaneous measurement of impulse response and distortion with a swept-sine technique" incorporated in its entirety above). For example, many of the prior art methods focus on the use of Fourier transform analyses of the log chirp response in the time domain, which does not allow for the flexibility provided by the conversion to the angular domain described above. For example, because each point in the time domain is at a different frequency, FFT and similar methods may not work since the frequencies are changing so quickly. Thus, these manipulations do not allow for certain tests which the above described methods are able to perform. For example, subtractive analysis (e.g., of the fundamental) using the first and second time domain responses cannot be performed using these FFT time domain analyses. Additionally, the ability to pipeline the testing and conversion process allows for faster more flexible testing than has been previously achieved.

As indicated above, this method has the capability to measure fundamental and harmonic components as well as to extract one or more of these components in the time domain. Once the desired time domain signal has been extracted, any other time domain processing can be performed on the signal such as filtering or sound quality analysis. Another benefit of this method is that the processing can be performed inline with the generation and acquisition of the stimulus signal as opposed to being post-processed in a single large block. The inline processing allows the entire measurement to be performed much quicker since the analysis overlaps with the generation and acquisition time. The analysis also can take advantage of parallel processing techniques which greatly increase the processing speed on multi-core PCs.

Figure 4:
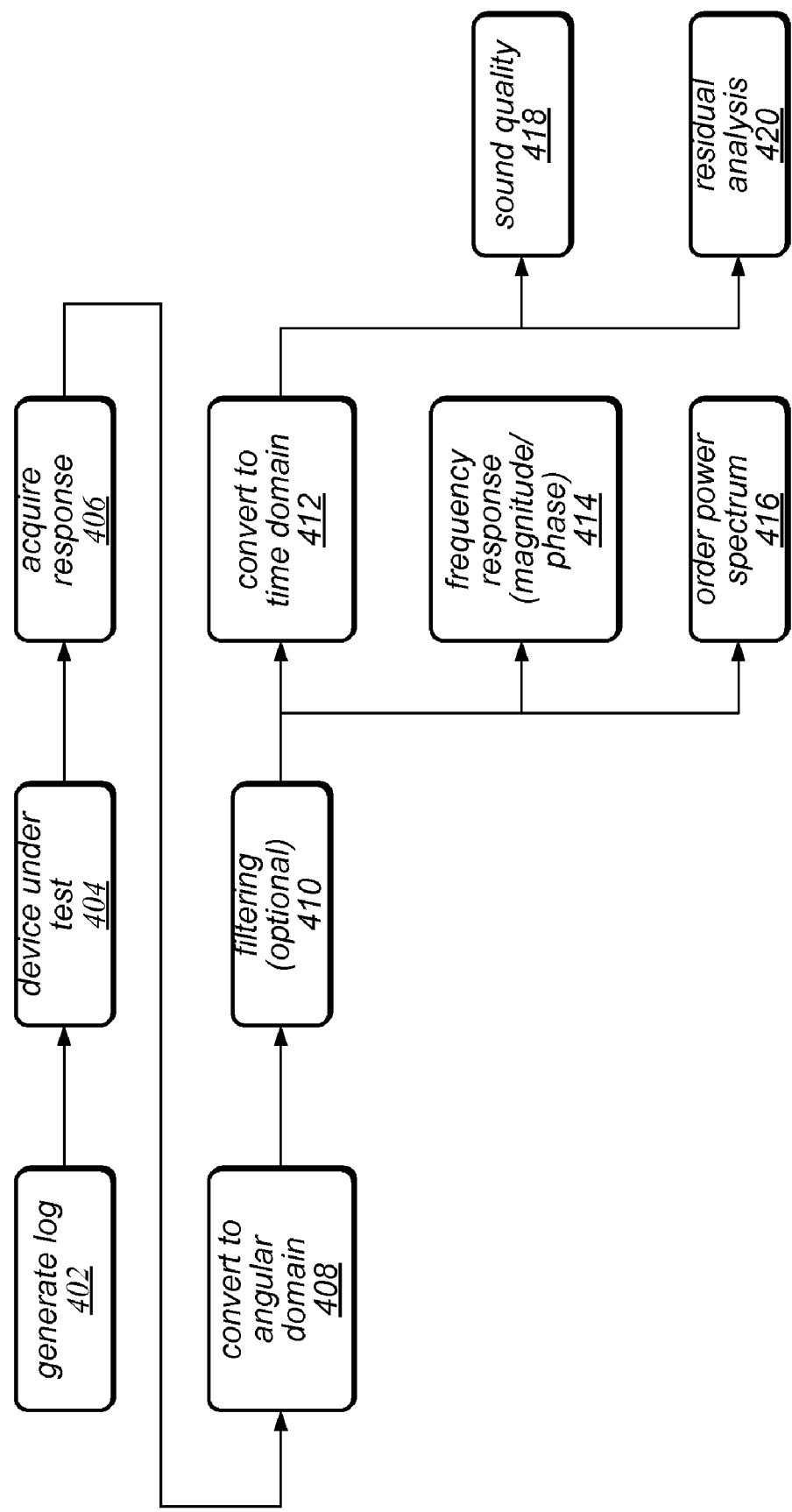

FIG. 4—Log Chirp Testing

FIG. 4 illustrates a method for performing log chirp testing on a device under test. However, it should be noted that any reference to "log chirps" or "log chirp testing" may also refer to any of various known signals or testing based on known signals (e.g., similar to descriptions above). The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As shown in FIG. 4, in 402, the log chirp may be created.

In 404, the log chirp may be provided to the device under test.

In 406, the response may be acquired.

In 408, the response may be converted to the angular domain.

In 410, the response may be filtered.

Various possibilities are envisioned after conversion in 408. For example, in 414, frequency response (magnitude/phase) may be measured, or in 416, order power spectrum analysis may be performed.

Alternatively, or additionally, in 412, the angular domain response may be converted to the time domain. After conversion, sound quality analysis may be performed in 418 or residual analysis may be performed in 420.

Figure 5:
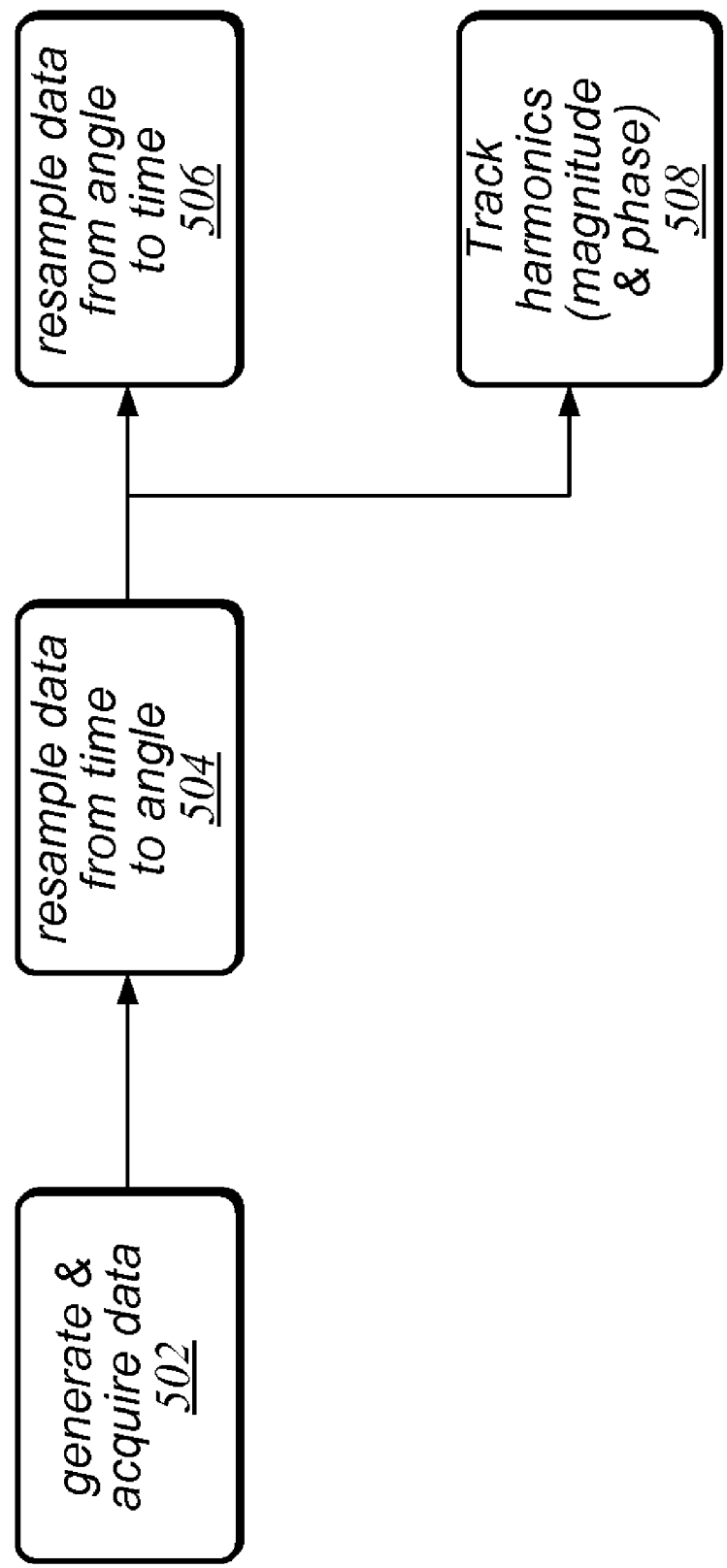

FIG. 5—Log Chirp Testing

FIG. 5 illustrates a method for performing log chirp testing on a device under test. However, it should be noted that any reference to "log chirps" or "log chirp testing" may also refer to any of various known signals or testing based on known signals (e.g., similar to descriptions above). The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 502, a log chirp may be generated and a response may be received. For example, hardware may be used to generate a log chirp signal. The log chirp signal may be sent to a device under test, and a response from the device under test may be acquired.

In 504, the data of the response may be converted or resampled from the time to angular domain. The data from the response may be acquired in the time domain. The data may be converted to an angular domain (e.g., an equal angle domain or order domain) where each sample in the waveform is located at an equal angular distance from the previous sample. In the angular domain, it may be much easier to separate fundamental and harmonic components of the response through the continuously sweeping log chirp. In some embodiments, the number of samples per revolution may be configurable. It may be desirable to set the number of samples to at least 2.5× the maximum harmonic that is to be investigated.

Note that additional anti-aliasing may be provided in the resampling process. For example, the harmonics whose order is above the "maximum harmonic" set may be removed from the signal. Notice that the stop band may be specified in the order of harmonic, and thus, its value may change with the frequency of the chirp signal. For example, if the "maximum harmonic" is set to 5, when the chirp is at 500 Hz, the stop frequency may be 2500 Hz. When the chirp is at 1000 Hz, the stop frequency of the anti-aliasing filter may increase to 5000 Hz.

Thus, this may act as a tracking filter which tracks the current frequency of the log chirp. However, it should be noted that the larger the stopband attenuation, the more taps may be needed to implement the filter. For example, using 10 samples/revolution, when the chirp is at 500 Hz, the passband frequency may be 2 kHz. When the chirp is at 1 kHz, the passband frequency may increase to 4 kHz.

In 506, the response may be converted from the angular domain to the time domain. The resulting time domain signal may have the same sample time as the original time domain signal. In one embodiment, this may allow the two signals (original and resampled) to be subtracted in order to detect any residual components in the signal which are not harmonically related (e.g., constant tones, impulses, noise, etc.).

Because of the existence of this anti-aliasing filter, the resulting time domain signal may be unequal to the original time domain signal. In some embodiments, the difference may be in the harmonics of high orders. If the user or test is interested in a specific harmonic, a bandpass filter may be applied in the order or angular domain before converting back to time domain.

In 508, harmonic magnitude and phase of fundamental and harmonic components of the signal may be tracked. This can be used to get a frequency response or transfer function of the device under test. Thanks to the resampling process, the harmonics can be separated easily in the angular domain by applying a digital band-pass filter with a fixed band specification. This fixed band specification in the angular domain may translate into a changing band specification that adapts to the frequency of the chirp signal. Using the resampling process and the order tracking, the system may act an adaptive filter for each order which can extract the signal for any particular order. The magnitude and phase of each harmonic can also be determined by demodulating the signal in the angular domain.

Similar to above, the bandwidth of the filter may be configurable. The harmonic tracking may be implemented by first shifting the desired harmonic to DC, decimating the data, applying a low pass filter, and then converting the real and imaginary components to magnitude and phase. The bandwidth of the low pass filter may also be configurable. The default may be 1.0× log chirp frequency. However, this can be reduced to have a narrower filter. As the bandwidth of the filter is decreased, the delay of the filter may be increased, which may result in fewer low frequency results. In some embodiments, the filters described above may be CIC (cascaded integrator-comb) filters.

As shown, 506 and 508 may be performed in parallel or optionally after 504. In other words, one or more of 506 or 508 may be performed, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for performing chirp testing, comprising:

a computer system providing a chirp to a device under test;

the computer system receiving a first time domain response from the device under test, wherein the first time domain response is in a time domain;

the computer system converting the first time domain response to an angular domain to create an angular domain response, wherein said converting comprises resampling the first time domain response from the time domain to the angular domain;

the computer system filtering the angular domain response;

the computer system converting the angular domain response to a second time domain response, wherein said converting comprises resampling the angular domain response from the angular domain to the time domain;

the computer system analyzing the first time domain response and the second domain response; and the computer system generating and storing testing results of the device under test based on said analyzing.

2. The method of claim 1, wherein said filtering comprises filtering fundamental tones from harmonic tones in the angular domain response.

3. The method of claim 2, wherein said analyzing the first time domain response and the second domain response comprises subtracting the first time domain response from the second time domain response and analyzing the resulting time domain response.

4. The method of claim 1, wherein said filtering the angular domain response comprises performing order tracking analysis.

5. The method of claim 1, wherein said filtering the angular domain response comprises performing order power spectrum analysis.

6. The method of claim 1, wherein said analyzing the first time domain response and second time domain response comprises performing residual analysis.

7. The method of claim 1, further comprising:
analyzing the angular domain response;
wherein said generating and storing the testing results is based on said analyzing the angular domain response.

8. The method of claim 7, wherein said analyzing comprises performing frequency response analysis.

9. The method of claim 7, wherein said analyzing the angular domain response comprises performing order power spectrum analysis.

10. The method of claim 1, wherein the chirp comprises a log chirp.

11. A non-transitory computer accessible memory medium storing program instructions executable to:
provide a log chirp to a device under test;
receive a first time domain response from the device under test, wherein the first time domain response is in a time domain;
convert the first time domain response to an angular domain to create an angular domain response, wherein said converting comprises resampling the first time domain response from the time domain to the angular domain;
filter the angular domain response;
convert the angular domain response to a second time domain response, wherein said converting comprises resampling the angular domain response from the angular domain to the time domain;
analyze the first time domain response and the second time domain response
generate and store testing results of the device under test based on said analyzing.

12. The non-transitory computer accessible memory medium of claim 11, wherein said analyzing the first time domain response and second time domain response comprises performing residual analysis.

13. The non-transitory computer accessible memory medium of claim 11, wherein the memory medium stores a graphical program which is executable to perform said providing, said receiving, said converting, said analyzing, and said generating.

14. The non-transitory computer accessible memory medium of claim 11, wherein said converting comprises using a Kaiser Window filter.

15. The non-transitory computer accessible memory medium of claim 11, wherein said providing, said receiving, said converting, said analyzing, and said generating are performed in a pipelined manner.

16. The non-transitory computer accessible memory medium of claim 11, wherein the program instructions are further executable to:
analyze the angular domain response;
wherein said generating and storing testing results is also based on said analyzing the angular domain response.

17. The non-transitory computer accessible memory medium of claim 16, wherein said analyzing the angular domain response comprises performing frequency response analysis.

18. The non-transitory computer accessible memory medium of claim 16, wherein said analyzing the angular domain response s performing order power spectrum analysis.

19. A method for performing chirp testing, comprising:
providing a known signal to a device under test;
receiving a first time domain response from the device under test, wherein the first time domain response is in a time domain;
converting the first time domain response to an angular domain to create an angular domain response, wherein said converting comprises resampling the first time domain response from the time domain to the angular domain;
filtering the angular domain response;
converting the angular domain response to a second time domain response, wherein said converting comprises resampling the angular domain response from the angular domain to the time domain;
analyzing the first time domain response and the second domain response; and
generating and storing testing results of the device under test based on said analyzing;
wherein the test results are useable to analyze the device under test.

20. A system for performing chirp testing, comprising:
an output for providing a chirp to a device under test;
an input for receiving a first time domain response from the device under test, wherein the first time domain response is in a time domain;
means for converting the first time domain response to an angular domain to create an angular domain response, wherein said converting comprises resampling the first time domain response from the time domain to the angular domain;
means for filtering the angular domain response;
means for converting the angular domain response to a second time domain response, wherein said converting comprises resampling the angular domain response from the angular domain to the time domain;
means for analyzing the first time domain response and the second domain response; and
means for generating and storing testing results of the device under test based on said analyzing;
wherein the test results are useable to analyze the device under test.

* * * * *